US008822201B2

(12) United States Patent
Köhler et al.

(10) Patent No.: US 8,822,201 B2
(45) Date of Patent: Sep. 2, 2014

(54) METHOD FOR RECOVERING OIL FROM PLANT SEEDS

(75) Inventors: Jörg Köhler, Elsfleth (DE); Volker Marschner, Bickenbach (DE); Bruno Winter, Stuttgart (DE)

(73) Assignee: AB Enzymes GmbH, Darmstadt (DE)

( * ) Notice: Subject to any disclaimer, the term of this patent is extended or adjusted under 35 U.S.C. 154(b) by 1429 days.

(21) Appl. No.: 12/448,482

(22) PCT Filed: Dec. 5, 2007

(86) PCT No.: PCT/EP2007/010562
§ 371 (c)(1),
(2), (4) Date: Oct. 16, 2009

(87) PCT Pub. No.: WO2008/080495
PCT Pub. Date: Jul. 10, 2008

(65) Prior Publication Data
US 2010/0041125 A1 Feb. 18, 2010

(30) Foreign Application Priority Data
Dec. 29, 2006 (DE) .......................... 10 2006 062 045

(51) Int. Cl.
*C11B 1/02* (2006.01)
*C10L 1/00* (2006.01)
(52) U.S. Cl.
CPC . *C11B 1/025* (2013.01); *Y02E 50/13* (2013.01)
USPC ............... 435/267; 435/271; 44/307; 44/308
(58) Field of Classification Search
CPC .............................. C11B 1/025; Y02E 50/13
USPC ................................................ 435/267, 271
See application file for complete search history.

(56) References Cited

U.S. PATENT DOCUMENTS

| 5,690,987 A * | 11/1997 | Parker et al. ................... 426/632 |
| 6,103,516 A * | 8/2000 | Reverso ........................ 435/271 |
| 2005/0089602 A1 | 4/2005 | Kvist et al. |
| 2008/0199587 A1* | 8/2008 | DeBonte et al. ............... 426/601 |

FOREIGN PATENT DOCUMENTS

| EP | 0 113 165 | 7/1984 |
| ES | 2 046 135 A1 | 1/1994 |
| WO | WO-91/13956 | 9/1991 |
| WO | WO-02/14459 A2 | 2/2002 |
| WO | WO-2006/131116 A1 | 12/2006 |

OTHER PUBLICATIONS

K. Sosulski et al., "Enzyme-Aided vs. Two-Stage Processing of Canola: Technology, Product Quality and Cost Evaluation", *JAOCS*, 70(9), pp. 825-829 (1993).
H. Dominguez et al., "Enzymatic Pretreatment to Enhance Oil Extraction from Fruits and Oilseeds: A Review", *Food Chemistry*, vol. 49, pp. 271-286 (1994).
H. Dominguez et al., "Enzyme-Assisted Hexane Extraction of Soya Bean Oil", *Food Chemistry*, vol. 54, pp. 223-231 (1995).
J. Vielma et al., "Top-spraying soybean meal-based diets with phytase improves protein and mineral digestibilities but not lysine utilization in rainbow trout, *Oncorhynchus mykiss* (Walbaum)", *Aquaculture Research*, vol. 35, pp. 955-964 (2004).
Notice of Opposition to European Patent Applicatio No. 07856386.3, mailed Jun. 6, 2013.
H. Dominguez et al., "Enzymatic treatment of sunflower kernels before oil extraction", Food Research International, 28 (6), pp. 537-545 (1996).
K. Sosulski et al., "Enzyme Pretreatment to Enhance Oil Extractability in Canola", Canola and Rapeseed, Production, Chemistry, Nutrition and Processing Technology, pp. 277-289, Van Nostrand Reinhold, New York (1990).
M.I.V. Brevedan et al., "Changes in composition and quality of sunflower oils during extraction and degumming", Grasas y Aceites, 51(6), pp. 417-423 (2000).
A. Sharma et al., "Enzyme-Assisted Aqueous Extraction of Rice Bran Oil", JAOCS, 78(9), pp. 949-951 (2001).
A. Sharma et al., "Enzyme-Assisted Aqueous Extraction of Peanut Oil", JAOCS, 79(3), pp. 215-218 (2002).
T. Godfrey et al., "Edible Oils", Industrial Enzymology, The Application of Enzymes in Industry, pp. 424-427, Macmillan Publishers, Ltd. (1983).
K. Sosulski et al., "Quality of Oil and Meal from Enzyme-Treated Canola Seeds", Engineering and Food, vol. 3: Advanced Processes, pp. 656-662, Elsevier Science Publishers, Ltd., Essex (1990).

* cited by examiner

*Primary Examiner* — William H Beisner
(74) *Attorney, Agent, or Firm* — Edwards Wildman Palmer LLP; Peter F. Corless

(57) ABSTRACT

The invention relates to a method for recovering of oil from plant seeds characterized in that a) an aqueous solution containing one or more cellulolytic and/or lipolytic and/or pectinolytic and/or proteolytic enzyme(s) and/or phytase is sprayed onto the seed, b) the thus obtained seed is directly supplied to a one-stage or multistage pressing in a way known per se, optionally coupled to an extraction, and c) the oil is recovered in a way known per se and optionally further processed, and the use of the method, particularly in the production of edible oil or biodiesel.

10 Claims, 1 Drawing Sheet

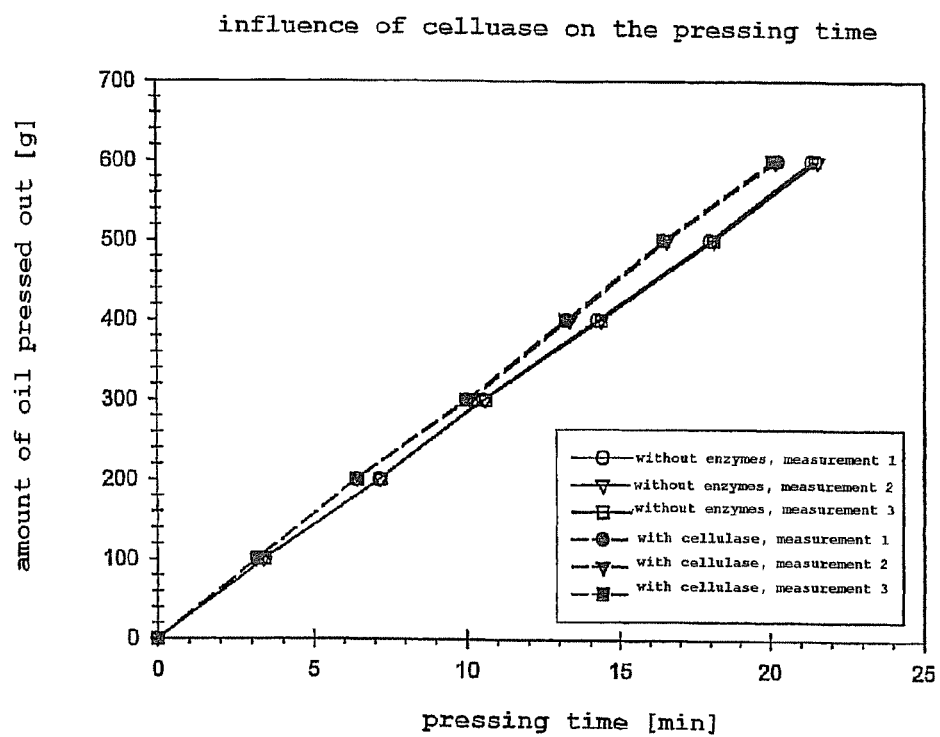

METHOD FOR RECOVERING OIL FROM PLANT SEEDS

The present invention relates to an improved method for recovering oil from plant seeds by use of enzymes. The invention particularly relates to a method in which enzymes are sprayed onto the dry oilseeds without significantly increasing the moisture content of the oilseed and in which the oil seeds may be pressed immediately afterwards.

Oilseeds such as soy bean, peanut, cotton seeds, sunflower seeds, corn germ and rape seeds (including canola) are the main source of edible oils. They cover more than 70% of the worldwide production of fats and oils from vegetable raw materials. Soy beans represent 20% thereof. These oilseeds are not only the main suppliers of oil but are also very good sources of high-quality protein, which is often also used for the purposes of animal feed.

The need for vegetable oils to replace fossil fuels has increased in the last few years. Of particular importance are soy oil in North and South America as well as rape oil (double-null types; 00 rape in which erucic acid and glucosinolates were removed by breeding) in Europe and Canada. The double-null types of rape, which were developed in Canada and cultivated in all of North America, were originally designated as Canola (Canadian oil, low acid) for reasons of marketing. Canola is now generally understood as designation for rape (actually rapeseed) in most parts of America and Australia. In fact, Canola rape or "Canadian rape" differs from the 00 types spread in Europe. Many of today's Canola types are also transgenic.

Besides its use as edible oil and raw material for edible fats, rape is mainly cultivated for the production of technical products in Germany. The cultivation of winter rape in Germany for the harvest of 2004 amounts to about 1.23 million hectare, which corresponds to a rapeseed amount of about 3.5 million tons. Much more than half of the vegetable oil produced in Germany is rape oil now. Around the world the harvested amount of rape in 2004/5 was 46 million tons with Europe, Canada, USA, Australia, China and India as the main cultivated areas. The cultivation of rape was third largest oilseed after soy and palm oil and is cultivated on about 13% of the arable land used. The cultivated area used for rape cultivation continuously increases all over the world.

The main amount of the rape is used for the production of rape oil methyl ester (RME), which is also known under the term biodiesel. Glycerol is hereby recovered as by-product.

Since biodiesel, particularly from rape, as a renewable raw material has a more favourable $CO_2$ balance than fossil fuels, is bio-degradable and more stable than, e.g., sunflower methyl ester (SME), and produces less carbon black than diesel fuel when being burnt, its production is strongly supported by the economy around the world. In 2005 the produced amount of biodiesel was 4 million tons in Europe, 50% of which were produced in Germany. In 2005 about 10 million tons of bio-diesel were produced all over the world. The annual amounts of cultivation of rape are continuously increasing.

Recovering oil from plant seeds may be carried out according to different methods. The oil is usually pressed out of the seed or extracted with organic solvents after crushing of the seed. Combination methods in which the oil component remaining in the press cake is extracted with organic solvents after a pressing step are also used. The used method strongly depends on the further use of the press cake. To be able to be used as feed, no organic solvent may be contained and the residual oil content should be low to have an optimal energetic value of the protein-rich press cake for mixing it in feed.

The extraction method has the disadvantage of high acquisition costs for the equipment and high current costs. Additionally, the solvents (e.g. hexane) are risky not only in the handling but also as regards health concerning the residues contained in the pomace. A further disadvantage of the extraction method is the fact that the attained oil quality is very low. The oil contains high amounts of phospholipids (100-600 ppm P), which must be removed before processing it to either edible oil or also to biodiesel. The admissible limit values are below 10 ppm P in the edible oil industry, preferably below 5 ppm P, and in the fuels industry below 14 ppm P, each calculated as phosphorus. In the edible oil industry, the reduction of the phospholipids conduces to the increase in the storage stability, since the phospholipids are hygroscopic and, thus, attract water, which results in cloudiness in the oil. In the fuels industry, the released phosphoric acids are aggressive in burning and lead to a faster wearout of the engines. Another disadvantage of the extraction method for the application of the extracted oil in the food industry is the high colour density of the extraction oil, which must be reduced by adsorption methods.

Moreover, enzymes were used to digest plant material to improve the yield of oil from oilseeds (cf., e.g., WO 1991/013956 A1 or EP 0 113 165 A1). All such methods are based on steps a) crushing the oilseed by grinding or pressing, b) adding water and enzyme, whereby the moisture content increases to 20%-35% or higher, c) incubating over 6-24 h at increased temperature, d) pressing out or centrifuging the oil or drying to below 10% residual moisture and extracting the oil or a combination of pressing and extracting (cf., e.g., Dominguez et al., 1995, Food Chem. 54: 223-231; Dominguez et al., 1994, Food Chem. 49, 271-286). It is particularly referred to the workings of Dominguez et al., 1995, which were carried out on soy. They refer to the importance of the higher water content in the step of the enzyme reaction as well as the reduced water content for the subsequent extraction.

The document "J Am Oil Chem Soc 1993, 70 (9), 825-829" schematically describes the use of an enzyme treatment before the pressing out of oilseeds as well as the influence of this enzyme treatment on the quality of the thus obtained oil as well as the energy balance of the method. The enzyme treatment is thereby carried out at a moisture content of 30% and 50° C. for six hours. The thus treated seed is dried to a moisture content of 6% before the pressing out.

Only by the use of a high water content during the enzyme reaction, cellulases, hemicellulases, proteases or enzyme mixtures of cellulases, pectinases and proteases, depending on the oilseed, proved themselves as effective enzymes. The aim of the enzymatic treatment is the weakening and the partial decomposition of the cell walls (primary and secondary cell wall) as well as the destruction of the membrane envelope surrounding the oil. The use of cellulases, hemicellulases and pectinases is possible for the former; the use of proteases for the hydrolysis of the oleosines is possible for the latter. The aim of the enzymatic treatment is the weakening of the cell walls and membranes surrounding the oil to enable an easier recovery.

These methods are very time-consuming and energy-intensive, particularly in order to reduce the high water content necessary for the enzyme reaction before the pressing steps or extraction steps. The space that is to be made available for the incubation is also very large if it is based on the average daily throughput of an oil mill of 200-1,000 t of recovered oil per day.

Thus, there is a need for improved methods for recovering oil from plant seeds, in which the above disadvantages of the state of the art do not occur.

Therefore, it is the objective of the present invention to provide an improved method for recovering oil from plant seeds. The method is not to show the disadvantages of the aforementioned state of the art. A method that results in high yields of oil as well as in a low phosphatide content and moisture content in the oil is to be particularly provided according to the invention. Moreover, the method is to be also applicable in an energy-saving and time-saving way and is to result in high yields of oil. Furthermore, the method is to be used universally, i.e., it is to be appropriate, for example, for recovering oil, e.g., for producing biodiesel, and also for recovering edible oil. In addition, the method is to be manageable simply and cost-efficiently and be appropriate for a wide range of oilseeds.

It has now surprisingly been found that by spraying enzymes onto the dry oilseeds, a method for recovering oil from plant seeds accompanied by an increased yield of oil, a decreased pressing duration and a decreased phosphatide content compared to the oils from conventional pressings may be obtained. Moreover, the moisture content of the oil seed is not significantly increased in any processing step by the method according to the invention.

Thus, the invention relates to a method for recovering oil from plant seeds, which is characterized in that a) an aqueous solution containing one or more cellulolytic and/or lipolytic and/or pectinolytic and/or proteolytic enzyme(s) and/or phytase is sprayed on the seed, b) the thus obtained seed is directly supplied to a one-stage or multistage pressing in a way known per se, optionally coupled to an extraction, and c) the oil is recovered in a way known per se and optionally further processed.

The invention also relates to the use of this method in the production of edible oil and in the recovery of oil, e.g., for the production of biodiesel.

In the method according to the invention, the enzyme solution is directly applied to the seeds or, as regards larger seeds, to the squashed or grinded seeds without the natural water content of the oilseed being thereby significantly increased. It has surprisingly been found that the enzyme solution may be directly sprayed on the dry seed without an incubation of the seed on which the enzyme was sprayed having to take place. The enzyme solution may be sprayed on the seed as such or after crushing. An aqueous solution containing the selected enzyme or the selected enzymes is thereby sprayed on the seed in a way known per se. The aqueous enzyme solution may be an enzyme solution recovered from the culture supernatant of micro-organisms in a way known per se (e.g. consisting of the steps: separating the bio-mass from the culture liquid, concentrating the obtained solution by ultra-filtration and disinfection filtration), which may also comprise stabilising agents. However, plant enzymes such as, e.g., papain, may also be contained in the enzyme solution. The typical amount of applied enzyme solution is in the order of 1,000 ppm based on the weight of the oilseed. The water applied by spraying on the enzyme solution increases the natural water content of the seeds (4-8% w/w) only by about 0.1 to max. 2% (w/w) based on the mass of the seed. The thus prepared seed may then be directly supplied to the pressing without further incubation period and without further water addition, and the oil may thereby be recovered. As opposed to the methods known from the state of the art, which use high water amounts, e.g., to avoid product inhibition of the enzymes or to improve the diffusion of the enzymes to the substrates, in the method according to the invention it is sufficient to use the natural water content of the oilseed. The enzymes lead to a change in the cell walls, whereby the outflow of the oil in the pressing is improved. In this case no complete degradation of the cell walls by the cellulases, hemicellulases or pectinases is necessary. Proteases support the destruction of the protein-containing membrane surrounding the oil body. Phytase supports the reduction of the interactions of the proteins via phytinic acid bridges, particularly as regards seeds that are rich in phytic acid such as soy, and, thus, the improvement of the oil flow in the pressing. The pressing procedure is also improved by the low water content, since it contributes to the reforwarding of the press cake in the press and to the fact that no pressing pressure can be built on the seed and the press cake due to great amounts of water.

Since the temperature may heavily increase in the pressing, sometimes to over 100° C. in the press cake, depending on the pressing pressure, thermostable enzymes should be preferably used for the method. The use of mesophilic and/or thermotolerant enzymes is, however, also possible. According to the invention, one or more enzymes are used, which are capable of lysing cell walls or cell membranes of plant cells or perforating them at least partially or loosening the membrane of the oleosines. Cellulolytic, hemicellulolytic, lipolytic, pectinolytic and/or proteolytic enzymes are particularly used. These enzymes may be used individually or also in combination, depending of the composition of the seeds, e.g., adding proteases to protein-rich seed such as soy beans is reasonable. Adding hemicellulolytic and pectinolytic enzymes is more reasonable for seed that contains an increased amount of these storage substances in the cell walls, and, thus, a use of cellulases alone would not cause a sufficient effect in the loosening or perforation of the cell wall. The use of pectinases attacking the protopectine of the middle lamellae may result in an improved paste formation for the pressing and, thus, in an easier release of oil. The use of galactomannanases may be advantageous, e.g., as regards soy beans. These enzyme activities are often contained in differently high amounts in commercially available pectinase products. The enzyme is particularly selected from naturally or recombinantly produced cellulases, endoglucanases, cellobiohydrolases, hemicellulases, peptidases, phospholipases, pectionases or phytases. Moreover, variants that are derived from the above enzymes may be used, for example, recombinant enzymes that were produced on the basis of the above enzymes and contain parts of the above enzymes and are modified in their activity by adding or removing substrate binding domains. Respective enzymes are commercially available or may be produced by a person skilled in the art. The enzymes may be used individually or in combination.

The kind and amount of the used enzyme thereby largely depends on the kind and the amount of the seed to be treated. Based on the present enzyme products, the dosages generally are between 100 and 20,000 ppm (w/w), more preferred between 200 and 15,000 ppm (w/w), even more preferred between 500 and 10,000 ppm (w/w). The dose may be higher regarding mesophilic enzymes to accommodate for the loss due to the thermic inactivation or the low residual activity at the higher temperatures during the pressing.

The pressing may be a one-stage or multistage pressing. Regarding a multistage pressing, the addition of the enzymes is also possible between the individual pressing steps. The pressing may be followed by an extraction step without the pressing material (grist) having to be reduced in its water content. Methods for carrying out an oil pressing are well known to a person skilled in the art. After the pressing, the oil is further processed in a way known per se.

The method according to the present invention is characterized by an increased throughput of seed per time unit as well as by an improved pressing performance and pressing yield as well as a lower phospholipid content or phosphatide content in the oil. Due to the increased yield and the increased pressing rate, the energy demand per t of recovered oil also declines. Since the water content only insignificantly increases by adding the enzyme solution on the dry seed, the method does not need a previous drying if extraction agents are used and, thus, has a clearly lower energy demand compared to the enzymatic methods developed up to now, which all comprised steps for reducing the water content of >25% to below 10% to not diminish the yield in the extraction.

Furthermore, the method according to the present invention has the advantage that the recovered oil has a clearly reduced phosphatide content compared to conventional methods and, thus, the degumming—that is, the reduction of the phosphatide content—may be limited to little amounts of the recovered oil, e.g., in multistage pressing methods.

The method according to the invention is very suitable for recovering oil for the production of edible oil or biodiesel.

The enclosed figure explains the invention in more detail:

The figure shows the reduction of the pressing time by the use of *Melanocarpus* cellulase with a *Trichoderma reesei* CBH1 cellulase binding domain (depiction of 3-fold determinations).

The method according to the invention may generally be carried out with any of the aforementioned enzymes. Cellulases, particularly endoglucanases, from *Acremonium thermophilum*, which belong to hydrolase family 45 (classification see http://afmb.cnrs-mrs.fr/CAZY/GH_intro.html), cellulases, particularly endoglucanases, from *Melanocarpus albomyces* (hydrolase family 45), which were connected with a cellulase binding domaine (CBD) of CBH1 from *Trichoderma reesei*, or cellulases, particularly cellobiohydrolases, from *Thermoascus aurantiacus* (hydrolase family 7), which were connected with a cellulase binding domain (CBD) of CBH1 from *Trichoderma reesei*, endoglucanase II from *Trichoderma reesei* and beta-glucosidase from *Chaetomium thermophilium* have turned out to be the preferred enzymes. Preferred hemicellulases are *Trichoderma reesei* xylanase II, xylanases xlnA from *Actinomadura flexuosa* and *Chaetomium thermophilum* xylanase xylA. Preferred pectinases are the pectinases from *Aspergillus niger* and *Trichoderma reesei*. Preferred phospholipases are phospholipases of type C and/or phospholipases of type A or B such as, e.g., the phospholipases from *Aspergillus fumigatus, Aspergillus foetidus* or *Thermomyces lanuginosus*. Preferred phytases are the phytase from *Aspergillus niger, E. coli, Peniophora lysii* or variants derived therefrom such as Nov9X or the *Aspergillus* consensus phytase.

The below examples explain the invention in more detail.

REFERENCE EXAMPLE 1

Determination of the Activity of the Neutral Cellulase

The endo-1,4-β-glucanase activity is determined by the hydrolysis of the substrate carboxymethyl cellulose at pH 7, 50° C. and an incubation time of 10 min. The released amount of reduced sugars is measured based on glucose after reaction with dinitrosalicylic acid by photometric detection of the developed color complex at 540 nm. A unit NCU is defined as the equivalent that corresponds to the release of one nanomol glucose per second.

1.8 ml substrate solution (3% CMC [Sigma C-56778, low viscosity] in 10 mM HEPES buffer pH 7.0 [Sigma H-3375] are tempered for 5 min at 50° C. and then 200 µl diluted enzyme solution are added and incubated for 10 min. Then 3 ml DNS reagent solution (10 g l$^{-1}$ disodium salicylic acid [Sigma D-0550], 16 g l$^{-1}$, NaOH, 300 g l$^{-1}$ K-Na tartrate [Merck 8087]) are added and incubated in the boiling water bath for 5 min. The measurements of the absorption are carried out against an equally treated reaction blank value, using water instead of enzyme solution.

REFERENCE EXAMPLE 2

Determination of the Activity of Thermostable Acidic Cellulases

The method is derived from the method of Reference Example 1 and uses an incubation temperature of 60° C. instead of 50° C. The second variation concerns the buffer. The HEPES buffer is replaced by a 10 mM citrate buffer, pH 4.8. The unit of the enzyme activity is CMU g$^{-1}$.

REFERENCE EXAMPLE 3

Determination of the Cellobiohydrolase Activity

Cellobiohydrolase (CBHI) and endoglucanase (EGI) hydrolyze the substrate 4-methylumbelliferyl-β-D-lactoside and thereby release 4-methylumbelliferone (7-hydroxy-4-methylcoumarin). This reaction may be photometrically observed by measuring the absorption of 4-methylumbelliferone under alkaline conditions at 370 nm. β-glucosidase activity in the sample is inhibited by 100 mM glucose in the reaction mixture. A PCU unit is defined as the amount of enzyme activity that releases one nmol 4-methylumbelliferon from 4-methylumbelliferyl-β-D-lactoside per second (1 PCU=1 nkat) under the experimental conditions (pH 5.0, 50° C., 10 min incubation time).

The amount of present endoglucanase may be measured individually by adding 5 mM cellobiose in the reaction batch, whereby the reaction of the cellobiohydrolase is inhibited by 4-methylumbelliferyl-β-D-lactoside.

250 µl substrate solution (1 mM 4-methylumbelliferyl-β-D-lactoside [Sigma M-2405]) in 50 mM sodium acetate buffer pH 5.0 and 50 µl 1 M glucose solution in 50 mM sodium acetate buffer are tempered at 50° C. for 10 min. After adding 200 µl of diluted enzyme solution, it is mixed and incubated for 10 min at 50° C. Then 1 ml 1M sodium carbonate solution is added to stop the enzyme reaction, and the absorption is measured against an equally treated blank value at 370 nm, using water instead of enzyme solution.

7-hydroxy-4-methylcoumarin [Aldrich 12,872-4] dissolved in 1 M sodium carbonate is used for calibration.

REFERENCE EXAMPLE 4

Determination of the β-Glucosidase Activity

β-glucosidase hydrolyzes the substrate 4-nitrophenyl-β-d-glucopyranoside to 4-nitrophenol and glucose. The reaction is stopped by adding alkali, and the 4-nitrophenol, which thereby turns yellow, is photometrically detected.

A unit BGU is defined as the equivalent that corresponds to the release of one nanomol 1-nitrophenol per second.

1.8 ml substrate solution (1 mM 4-nitrophenyl-β-D-glucopyranoside [Merck 6793] in 50 mM citrate buffer [Merck 6448], pH 4.8) are tempered at 50° C. for 5 min. Then 200 µl diluted enzyme solution are added and incubated for 10 min at 50° C. After 10 min, 1 ml 1 M Na$_2$CO$_3$ solution is added, and the absorption is measured against an equally treated reaction blank value at 400 nm, using water instead of enzyme solution.

The calibration curve is prepared with 4-nitrophenol [Sigma 104-8].

REFERENCE EXAMPLE 5

Determination of the Phosphatide Content in Oil

The phosphatide content (or also referred to as phospholipid content) is expressed as ppm phosphorus in oil. After incineration, it is photometrically determined at 830 nm when adding magnesium oxide as phophomolybdate complex at 850° C. K$_2$HPO$_4$ is used for calibration.

The phosphatide content may also be determined flame-photometrically directly in the oil by means of an MS device.

The phosphatide content in the complete oil of the rapeseed of Examples 1 to 3, which was extracted with n-hexane corresponding to the method of Reference Example 6, was about 93 ppm P.

REFERENCE EXAMPLE 6

Determination of the Oil Content by Means of the Soxhlet Method 15 g ground rapeseeds or 20-25 g crushed extraction grist are introduced into an extraction thimble [Sartorius reference number FT-1210-033080] and extracted with highly pure n-hexane (Merck) over 4 h in a Soxhlet apparatus. The amount of recovered oil is weight in vacuum after evaporation of the solvent.

The rapeseed of Examples 1 to 3 contains 41 % oil.

REFERENCE EXAMPLE 7

Determination of the Color of Oil

The oil that was recovered by pressing or by extraction from an oilseed is centrifuged at 12,000×g for 5 min to separate suspended particles, and then the color is determined in a 1 cm cuvette at 508 nm against water in the photometer.

The total oil extracted with hexane according to Reference Example 6 of the rapeseed ground by an impact mill of Examples 1 and 3 had an absorption of 1.2 AU and, thus, a stronger basic color.

EXAMPLE 1

Use of Enzymes to Increase the Pressing Rate

Experiment 1:
An *Acremonium thermophilum* endoglucanase recombinantly produced with *Trichoderma reesei* with a molecular weight of about 28.6 kDa and a temperature optimum of about 75°-80° C. was used for the following experiment such as, e.g., described in FI 20051318. The enzyme solution (endoglucanase), a sterilely filtered ultrafiltration concentrate with a dry mass of about 15%, was finely nebulized and sprayed on the dark rapeseeds of the company DKSH, The Netherlands, harvest 2005, using a cylinders stroke nozzle (0.1% w/w), and the rapeseed was then well mixed for 30 s. The dosage of the endoglucanase was at 64,400 CMC per kg rapeseed. The thus prepared rape was subjected to a one-stage pressing in an oil press, e.g., of the type Ölprinz of the company Kernkraft (www.oelpresse.de), Germany. The press ran with a speed of 25 upm and was equipped with a pressing head with a 12 mm opening and set to a clearance of 1.5 mm. The residence time of the rape in the pressing head was about 1-2 min. A thermosensor with an attached measuring device of the company Roth was inserted into the pressing head to determine the pressing head temperature. The oil was collected in a glass bowl placed on scales, and the amount and the pressing rate as well as the temperature of the oil were determined. The press cake was taken in another bowl placed on separate scales and was then crushed in a coffee grinder with hammer mechanism to determine the residual oil content by extraction according to Reference Example 6.

The effect of *Acremonium* endoglucanase on the pressing rate is depicted in the figure. The experiment was repeated three times with and without enzyme addition. The same amount of rapeseed was always used, so that the attained pressed out amount of oil was about 600 g each. As depicted in the figure, there is a very high reproducibility over the used pressing time of about 22 min. There are no significant variations between the individual repetitions of the measurement. The increase in the throughput of rape by the oil mill and, thus, a reduction of the pressing time to attain a constant yield of oil was attained in all three runs. The improvement of the pressing performance of the oil mill resulted in an increase in the obtained oil of 6.6% per hour.

The phosphatide contents in the pressed out oil were very low at 6.5-8 ppm P and enable a direct further processing of the oil in the edible oil industry and also in the production of biodiesel. The values of the phosphatide content were 5%-10% below those of the pressings without enzyme addition. This was to be expected for the absolutely low phosophatide contents.

The pressing head temperature without enzyme addition was in average at all three measurements at 77.0° C., whereas if endoglucanase was used, the temperature at the average value only increased to values of 75.4° C. over all three measurements in spite of increased rape throughput per time unit and, thus, a potentially higher friction in the pressing head. This clearly shows that there was a more efficient pressing that is more gentle to the oil if enzymes are added.

If enzymes were added, the color of the pressed oil improved from an absorption in the average of 0.801 AU to 0.776 AU. These values are clearly better than the color of oil from rapeseed that was only extracted by hexane of 1.2 AU and, thus, enable a reduction of the use of bleaching agents/bentonite in the further processing to edible oil and to save money.

Experiment 2:
In this experiment a cellubiohydrolase from *Thermoascus aurantiacus*, which carries the *Trichoderma reesei* CBH1 cellulose binding domain at the C-terminal end, (e.g., produced according to WO 2006/117432 A1) was used in a dosage of 180 PCU per kg rapeseed, having the same experimental structure. The cellobiohydrolase has a molecular weight of about 46.2 kDa and the attached CBH1 linker and the CBH1 binding domain have a molecular weight of about 6.8 kDa. The enzyme has a temperature optimum of about 65° C. As also in the cellulase of experiment 1, an increase in the throughput and, thus, an amount of oil per time unit that was 10.8% higher could thereby be attained.

Experiment 3:
More mesophilic enzymes than those used in experiments 1 and 2 or 2 such as the endoglucanase I from *Trichoderma reesei* with a temperature optimum of about 50° C. (e.g., described in EP 0 137 280 A1) could also contribute to a shortened relative pressing time at higher dosages, and, thus, to an increase in the throughput. In a dosage of 376,000 BU per kg rapeseed an increase in the throughput by 2.1% and at a dosage of 752,00 BU per kg rapeseed and increase in the throughput by 6.3% could be attained.

EXAMPLE 2

Use of Enzyme Mixtures to Increase the Pressing Rate and to Improve of the Yield of Pressed Oil Another enzyme than that of Example 1 was used for the experiments, namely a recombinantly with *Trichoderma reesei* produced neutral cellulase from *Melanocarpus albomyces*, which comprises a *Trichoderma reesei* CH1 cellulose binding domain, as it is described in WO 2006/117432 A1, as well as the recombinantly with *Trichoderma reesei* produced endoglucanase from *Acremonium* of Example 1, experiment 1. The *Melanocarpus* cellulase has a molecular weight of about 20.2 kDa, and the attached linker with the CBD of the cellobiohydrolase 1 from *Trichoderma reesei* has a molecular weight of about 6.8 kDa. The enzyme has a temperature optimum of about 75° C. The dosages were at 64,400 CMC per kg rapeseed for the endoglucanase from *Acremonium* and 130,000 NCU per kg rapeseed for the neutral cellulase from *Melanocarpus*. The sprayed on amounts of the enzyme solution were each 0.1% (w/w) based on the mass of the rapeseed. The enzyme solutions were sterilely filtered ultrafiltrates with a dry mass of about 15% (w/w). The experimental structure was the same as in Example 1 with the exception that the nozzle opening was only 10 mm instead of 12 mm. Better pressing results may thereby be attained. The same rape (same charge) as in Example 1 was also used, so that the results are directly comparable. The results are depicted in Table 1.

increase in temperature is caused by the narrowing of the gap width of the press and the thus generated higher pressing pressure.

In the blank value and the experiment with water without enzyme, which was carried out for comparative purposes, the phosphatide content in the pressed oil compared to the conditions with bigger nozzle (Example 4) increased as expected from 8 to up to 14 ppm P and is, thus, above the limit value applicable for edible oil and at the margin of the content allowed for biodiesel production. However, the phosphatide contents in the oil pressed with enzyme addition as well as in Example 4 were on a low level of only 8-9 ppm P. Therefore, the enzyme addition has also positive effects on the lowering of the phosphatide contents in the pressed oil compared to the oil that was obtained without enzyme addition. The enables the further processing of the thus recovered oil to edible oil and to biodiesel without degumming.

Moreover, the time that is needed to obtain the same amount of pressed oil (relative pressing time) could be clearly reduced again, and, thus, the throughput of the oil mills could be increased. The relative running times or pressing times were not only reduced by 6% but were even reduced by up to 14.6%.

Similar results were also attained by a recombinantly with *T. reesei* produced beta-glucanase from *Chaetomium thermophilum* with a molecular weight of about 76.4 kDa and a temperature optimum of 65° C., produced as described in FI20051318, for example. The dosage was at 17,840 BGU per kg rapeseed. Not only the space-time yield (obtained oil per device, kg rapeseed and time unit) increased by 3% but also the absolute oil yield by pressing increased by a total of 2%.

TABLE 1

Use of a cellulase or a endoglucanase for improving the yield of oil in a pressing of rape and reducing the pressing time to attain the same amount of oil.

| enzyme | pressing head temperature [° C.] | relative pressing time * [%] | Oil yield [%] ** | residual oil content in the press cake [%] | phosphatide content in the pressed oil [ppm P] |
|---|---|---|---|---|---|
| none | 83.0 | 100.0 | 34.7 | 16.6 | 11 |
| only water | 86.5 | 100.2 | 34.5 | 16.4 | 14 |
| endoglucanase | 82.5 | 86.9 | 35.3 | 16.1 | 9 |
| neutral cellulase | 81.8 | 85.4 | 35.1 | 16.1 | 8 |

In the batch water, the same amount of water (0.1% (w/w) based on the mass of rapeseed) as is applied in the enzyme solutions was used.
* The relative pressing time is the time that is needed to attain the same amount of oil.
** The oil yield indicates the absolutely obtained yield of oil from the rapeseed, independent of the running time of the pressing procedure.

As shown in the results, the yield of oil in the pressing may be increased by means of corresponding enzymes if the pressing parameters are correctly selected, particularly the selection of the nozzle opening of the press. The advantage of this oil is the low phosphatide content, which enables a direct further processing without degumming. This also applies despite the pressing temperature being about 10° C. higher as compared to the conditions in experiment Example 1. The

EXAMPLE 3

Effect of the Use of Enzyme on the Phosphatide Content in the Residual Oil Extract In the experiments of Examples 1 and 2 the collected press cake was homogenized and crushed. The oil that was still contained in the press cake, also referred to as residual oil, was extracted from aliquot portions of the crushed press cake according to Reference Example 6, and the phosphatide content was determined therein according to Reference Example 5. The results are summarized in the following table.

TABLE 2

Determination of the phosphatide content of the residual oil extracted from the press cake.

| enzyme | amount of pressed oil *** in the total oil **** [%] | phosphatide content in the pressed oil [ppm P] | phosphatide content in the extraction oil [ppm P] |
|---|---|---|---|
| only extraction * | n.a. | n.a. | 85-99 |
| none ** | 83.7 | 9 | 73.6 |
| endoglucanase | 83.6 | 8 | 70.5 |

* In this batch the rapeseed was only crushed and then directly extracted with n-hexane without a previous pressing.
** In this batch no enzyme was added and the rapeseed was directly pressed.
*** Pressed oil: oil obtained by pressing.
**** Total oil: amount of oil that was obtained by extraction of the disintegrated rapeseed.
n.a. not applicable As the above results show, the release of the residual phosphatides is strongly inhibited in the extraction of the residual oil still remaining in the press cake (total oil minus pressed oil; about 16-17% of the total oil) by the use of enzymes. If the complete oil is extracted, about 3.5 to 4.0 mg P of phospholipids are also extracted (total amount of oil* phosphatide content of the oil obtained by extraction). The pressed oil only contains 0.274 to 0.309 mg P (pressed oil* phosphatide content in the pressed oil) and the subsequently extracted residual oil again 0.474 to 0.492 mg P (residual oil* phosphatide content in the residual oil). Thus, 2.7 to 3.3 mg P of phospholipids remain in the press cake by the use of enzymes after extraction following the pressing, which corresponds to more than ¾ to ⅘ of the total phospholipids in the rape that are to be obtained by extraction alone. Thus, here the use of enzymes also results in an improvement of the extracted residual oil by reducing the phospholipid content compared to the extraction alone and, thus, to a reduction of the degumming work to be carried out subsequently.

The invention claimed is:

1. A method for recovering oil from plant seeds comprising:
   a) spraying an aqueous solution containing one or more cellulolytic and/or lipolytic and/or pectinolytic and/or proteolytic enzyme(s) and/or phytase directly onto the dry seed without incubating said seed in water,
   b) supplying the thus obtained seed directly to a one-stage or multistage pressing, optionally coupled to an extraction, and
   c) recovering the oil and optionally further processing said oil.

2. The method according to claim 1 wherein the enzyme is selected from natural or recombinant cellulases, endoglucanases, cellobiohydrolases, hemicellulases, pectinases, phospholipases, proteases or phytases.

3. The method according to claim 2 wherein the enzyme is selected from *Acremonium thermophilium* endoglucanases, *Melanocarpus albomyces* endoglucanases, optionally connected with a cellulase binding domain of CBH1 from *Trichoderma reesei*, cellobiohydrolases from *Thermoascus aurantiacus*, optionally connected with a cellulase binding domain of CBH1 from *Trichoderma reesei*, endoglucanase II from *Trichoderma reesei* and beta glucosidase from *Chaetomium thermophilum*, *Trichoderma reesei* xylanase II, xylanase xlnA from *Actinomadura flexuose*, xylanase xylA from *Chaetomium thermophilum*, pectinases from *Aspergillus niger* and *Trichoderma reesei*, type A, type B or type C phospholipases from *Aspergillus fumigatus, Aspergillus foetidus* or *Thermomyces lanuginosus*.

4. The method according to claim 1 wherein the seed is peeled and/or crushed before spraying on the enzyme.

5. The method according to claim 1 wherein the enzyme is additionally sprayed on the already pressed seed between the individual pressings.

6. The method according to claim 1 wherein an extraction step is carried out after the pressing.

7. The method according to claim 1 wherein the plant seeds are selected from oleaginous seeds.

8. The method according to claim 7 wherein the oleaginous seeds are selected from soy beans, peanut, cotton seeds, sunflower seeds, corn germ and rapeseeds.

9. A method for producing an edible oil by recovering oil from plant seeds comprising:
   a) spraying an aqueous solution containing one or more cellulolytic and/or lipolytic and/or pectinolytic and/or proteolytic enzyme(s) and/or phytase directly onto a dry plant seed without incubating said plant seed in water,
   b) supplying the thus obtained seed directly to a one-stage or multistage pressing, optionally coupled to an extraction, and
   c) recovering the oil and optionally further processing said oil, thereby producing the edible oil.

10. A method for producing biodiesel by recovering oil from plant seeds comprising:
    a) spraying an aqueous solution containing one or more cellulolytic and/or lipolytic and/or pectinolytic and/or proteolytic enzyme(s) and/or phytase directly onto a dry plant seed without incubating said plant seed in water,
    b) supplying the thus obtained seed directly to a one-stage or multistage pressing, optionally coupled to an extraction, and
    c) recovering the oil and optionally further processing said oil, thereby producing the biodiesel.

* * * * *